US009814078B2

(12) United States Patent
Park et al.

(10) Patent No.: US 9,814,078 B2
(45) Date of Patent: Nov. 7, 2017

(54) METHOD AND APPARATUS FOR DETERMINING CONTENTION WINDOW SIZE IN COMMUNICATION SYSTEM

(71) Applicant: ELECTRONICS AND TELECOMMUNICATIONS RESEARCH INSTITUTE, Daejeon (KR)

(72) Inventors: Seung Keun Park, Daejeon (KR); Sungjin Yoo, Daejeon (KR); Jung Sun Um, Daejeon (KR); Hoiyoon Jung, Daejeon (KR); Hyung Do Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 114 days.

(21) Appl. No.: 15/065,602

(22) Filed: Mar. 9, 2016

(65) Prior Publication Data
US 2016/0269303 A1    Sep. 15, 2016

(30) Foreign Application Priority Data

Mar. 12, 2015 (KR) .................. 10-2015-0034232
Aug. 6, 2015 (KR) .................. 10-2015-0111008
Mar. 3, 2016 (KR) .................. 10-2016-0025910

(51) Int. Cl.
*H04W 74/08* (2009.01)
*H04W 84/12* (2009.01)

(52) U.S. Cl.
CPC .......... *H04W 74/085* (2013.01); *H04W 84/12* (2013.01)

(58) Field of Classification Search
CPC .................................................... H04W 74/085
See application file for complete search history.

(56) References Cited

U.S. PATENT DOCUMENTS

| 7,260,081 | B2 | 8/2007 | Lee et al. |
| 2012/0106371 | A1 | 5/2012 | Abraham et al. |
| 2013/0208656 | A1 | 8/2013 | Park et al. |
| 2014/0341018 | A1 | 11/2014 | Bhushan et al. |
| 2015/0245382 | A1 | 8/2015 | Park et al. |
| 2017/0019909 | A1* | 1/2017 | Si .................. H04W 76/048 |

FOREIGN PATENT DOCUMENTS

KR    10-2015-0073165 A    6/2015

* cited by examiner

*Primary Examiner* — Ronald B Abelson

(57) ABSTRACT

A wireless device of a communication system randomly selects a backoff counter at a contention window interval corresponding to a contention window size that is determined according to a backoff stage, attempts packet transmission, when the backoff counter becomes 0 while reducing the backoff counter, when a radio channel is in an idle status, and increases the contention window size while increasing the backoff stage by 1 according to a first predetermined condition. In this case, as the backoff stage increases, a contention window size has a concave down increasing form.

20 Claims, 9 Drawing Sheets

METHOD AND APPARATUS FOR DETERMINING CONTENTION WINDOW SIZE IN COMMUNICATION SYSTEM

CROSS-REFERENCE TO RELATED APPLICATION

This application claims priority to and the benefit of Korean Patent Application Nos. 10-2015-0034232, 10-2015-0111008 and 10-2016-0025910 filed in the Korean Intellectual Property Office on Mar. 12, 2015, Aug. 6, 2015 and Mar. 3, 2016, respectively, the entire contents of which are incorporated herein by reference.

BACKGROUND OF THE INVENTION (a) Field of the Invention

The present invention relates to a method and apparatus for determining a contention window size in a communication system. More particularly, the present invention relates to a method and apparatus for determining a contention window size in a communication system using a Listen Before Talk (LBT) method.

(b) Description of the Related Art

In a Carrier Sensing Multiple Access with Collision Avoidance (CSMA/CA) method of a wireless Local Area Network (LAN), a busy status of a radio channel to transmit a packet is determined through sensing, and when it is detected that the radio channel is in a busy status by another wireless device, transmission is not started but stands by until a radio channel is in an idle status. If a radio channel is in an idle status, in order to avoid a collision, a determined transmission standby slot time is further stood by, and packet transmission is started. A transmission standby slot time is determined by a randomly selected backoff counter using uniform distribution at a predetermined contention window size.

When a response signal to a packet that is transmitted from the reception side is not received, a contention window size increases. A contention window size is binary exponentially determined, as in Equation 1, and such a method is referred to as Binary Exponential Backoff (BEB).

$$W_i = W \cdot 2^i \quad \text{(Equation 1)}$$

where W is an initial value of a predetermined contention window size, and i is a backoff stage and is an integer sequentially having a value K representing a final (or maximum) contention window size state from 0 representing a minimum contention window size state. That is, by increasing one by one according to a predetermined condition such as a collision, i sequentially has values 0, 1, 2, 3, ..., K.

A contention window size is first set to a minimum contention window size according to such a BEB method, and when a collision continuously occurs, a contention window size binary exponentially increases by Equation 1.

In IEEE 802.11 Distributed Coordination Function (DCF), a contention window interval according to a backoff stage i is determined to [0, CWi], and CWi is a value that subtracts 1 from Wi and has a relationship of Wi-1.

Because a conventional BEB method in which a contention window size exponentially increases, as in Equation 1, performs an important function in determination of a throughput and a short-term fairness performance of a wireless LAN, BEB performance enhancing methods have been suggested based on an increase speed of a contention window size up to now. Particularly, a recently newly suggested method includes a polynomial backoff method such as Equation 2.

$$W_i = W \cdot (1+i)^x \quad \text{(Equation 2)}$$

where x is an exponential value, and when x is 2, x is referred to as Quadratic Backoff (QB) and is represented with Equation 3.

$$W_i = W \cdot (1+i)^2 \quad \text{(Equation 3)}$$

It has been known that such a QB method is more excellent than an existing BEB method in a throughput and a short-term fairness performance of a wireless LAN.

SUMMARY OF THE INVENTION

The present invention has been made in an effort to provide a method and apparatus for determining a contention window size more excellent than a QB method in a throughput and a short-term fairness performance of a wireless LAN in a communication system using an LBT method.

An exemplary embodiment of the present invention provides a method in which a wireless device of a communication system determines a contention window size. The method includes: randomly selecting a backoff counter at a contention window interval corresponding to a contention window size that is determined according to a backoff stage; attempting packet transmission, if the backoff counter becomes 0 while reducing the backoff counter, when a radio channel is in an idle status; and increasing the contention window size while increasing the backoff stage by 1 according to a first predetermined condition, wherein the contention window size has a concave down increasing form, as the backoff stage increases.

The contention window size may be calculated by Equation 1, the Equation 1 is $W_i = W \cdot [q \cdot (i)^p + 1]$, and the q may be a positive real number, the p may be a real number between 0 and 1, [x] may be a function of returning an integer value nearest to x, the i may be the backoff stage, and the W may be an initial value of a contention window size.

The method may further include receiving values of the q, the p, and the W from a node that manages a network.

The method may further include selecting values of W, p, and q corresponding to a category of a packet to transmit among values of W, p, and q that are determined according to a data category.

The method may further include selecting one of 10, 11, and 12 as an initial value of the contention window size.

The first predetermined condition may include at least one of increase of the number of wireless devices in a network, a collision between transmission, and no response to transmission.

The method may further include initiating the backoff stage to the initial value and initializing the contention window size according to a second predetermined condition.

The second predetermined condition may include at least one of success of the packet transmission and reduction of the number of wireless devices in a network.

The q may be obtained from an entire average from 0 to the K power of 2, when a maximum value of the backoff stage is K.

The p may be obtained by Equation 2, the Equation 2 is q $K^p + 1 = L$ and the L may be a predetermined reference value.

The q may be obtained from an arithmetic mean from 0 to the K power of 2, when a maximum value of the backoff stage is K.

The p may be obtained by Equation 2, the Equation 2 is q $K^p + 1 = L$ and the L may be a predetermined reference value.

Another embodiment of the present invention provides an apparatus that determines a contention window size in a wireless device of a communication system. The contention window size determination apparatus includes a processor and a transceiver. The processor randomly selects a backoff counter at a contention window interval corresponding to a contention window size, attempts packet transmission, if the backoff counter becomes 0 by gradually reducing, when a radio channel is in an idle status, and increases the contention window size while increasing the backoff stage by 1 according to a first predetermined condition. The transceiver is connected to the processor and transmits/receives a wireless signal. The contention window size has a concave down increasing form, as the backoff stage increases.

The processor may calculate the contention window size based on Equation 1, the Equation 1 is $W_i = W \cdot [q \cdot (i)^p + 1]$, and the q may be a positive real number, the p may be a real number between 0 and 1, [x] may be a function of returning an integer value nearest to x, the i may be the backoff stage, and the W may be an initial value of a contention window size.

The processor may select values of W, p, and q corresponding to a category of a packet to transmit among values of W, p, and q that are determined according to a category of data and apply the selected values to Equation 1.

The processor may use one of 10, 11, and 12 as an initial value of a contention window size.

The q may be obtained from an entire average or an arithmetic mean from 0 to the K power of 2, when a maximum value of the backoff stage is K. The first predetermined condition may include at least one of increase of the number of wireless devices in a network, a collision between transmission, and no response to transmission.

The processor may initialize the backoff stage to the initial value and initialize the contention window size according to a second predetermined condition, and the second predetermined condition may include at least one of success of the packet transmission and reduction of the number of wireless devices in a network.

DETAILED DESCRIPTION OF THE EMBODIMENTS

Figure 1:
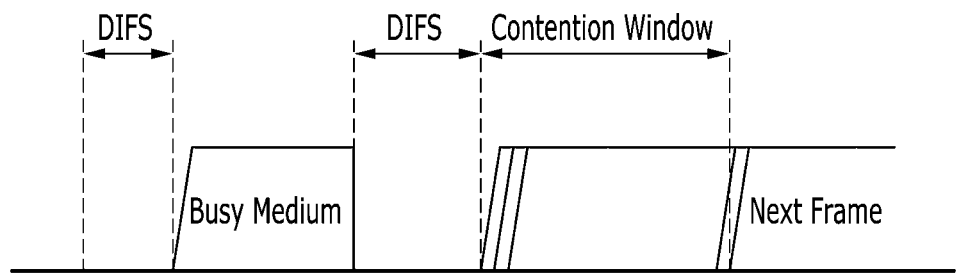
FIG. 1 is a diagram illustrating a channel access method of a terminal in a communication system using an LBT method according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification and claims, unless explicitly described to the contrary the word "comprise" and variations such as "comprises" or "comprising" will be understood to imply the inclusion of stated elements but not the exclusion of any other elements.

In an entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and an user equipment (UE) and may include an entire function or a partial function of the MT, the MS, the AMS, the HR-MS, the SS, the PSS, the AT, and the UE.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a BS function, a relay node (RN) that performs a BS function, an advanced relay station (ARS) that performs a BS function, a high reliability relay station (HR-RS) that performs a BS function, and a small BS[a femto BS, a home node B (HNB), a home eNodeB (HeNB), a pico BS, a metro BS, and a micro BS] and may include an entire function or a partial function of the ABS, the nodeB, the eNodeB, the AP, the RAS, the BTS, the MMR-BS, the RS, the RN, the ARS, the HR-RS, and the small BS.

Hereinafter, a method and apparatus for determining a contention window size in a communication system according to an exemplary embodiment of the present invention will be described in detail with reference to the drawings.

FIG. 1 is a diagram illustrating a channel access method of a terminal in a communication system using an LBT method according to an exemplary embodiment of the present invention.

Referring to FIG. 1, before transmitting data, wireless devices perform Carrier Sense Multiple Access with Collision Avoidance (CSMA/CA) operation. A CSMA/CA mechanism basically adapts a Listen Before Talk (LBT) connection mechanism. Therefore, before starting data transmission, wireless devices sense a radio channel. After standing by for a DCF Inter-Frame Space (DIFS) time, when a radio channel is in a busy status at a backoff stage, wireless devices select a random contention window value with a backoff counter in a range of a contention window that selects the backoff counter, stand by for a time corresponding to the selected backoff counter, and attempt transmission. After standing by for a DIFS time, when a radio channel is in an idle status, wireless devices may access a channel and attempt transmission. While determining a channel status, wireless devices that stand by access to a radio channel reduce a backoff counter thereof. When a backoff counter of a specific wireless device becomes 0, if the radio channel is in an idle status, the wireless device accesses a channel and transmits data. Before the backoff counter 0 becomes, when another wireless device uses a corresponding radio channel, the wireless device stops reducing the backoff counter, determines a radio channel status for a DIFS time, and restarts a channel access operation with a remaining backoff counter.

That is, after standing by for a DIFS time, when a radio channel is in an idle status, wireless devices reduce a backoff counter thereof, and when the radio channel is in a busy status, wireless devices do not reduce a backoff counter thereof.

When data is successfully transmitted, the wireless devices initialize a backoff stage and a contention window size, and when transmission is detected to collision, the wireless devices increase the backoff stage one by one and increase a contention window size to reduce a collision occurrence possibility. When a collision continuously occurs, the wireless devices may increase a contention window to a maximum contention window size. When a collision occurs in this way, by increasing a contention window size, a selection range of a random backoff counter is enlarged and thus a collision probability can be reduced.

As a method of determining a contention window size, a BEB method or a QB method has been conventionally used, but in an exemplary embodiment of the present invention, a new method is suggested.

A wireless device according to an exemplary embodiment of the present invention determines a contention window size with Equation 4.

$$W_i = W \cdot [q \cdot (i)^p + 1] \quad \text{(Equation 4)}$$

where q is a positive real number, p is a real number between 0 and 1, and a symbol [x] is a function of returning an integer value nearest to x. i is a backoff stage, is a parameter representing a state of a contention window size in a wireless device, and is an integer sequentially having a value K representing a final (or maximum) contention window size state from 0 representing a minimum contention window size state. A maximum value of a contention window size may be designated. W is an initial value of a contention window size.

Values of p and q may be selected so that a value $W_K$ corresponding to a contention window size that is determined when i=K by Equation 4 is smaller than a value $W_K$ that is obtained by Equation 1.

q is determined with a method of increasing a contention window size with an entire average concept of 0 to the K power of 2 unlike exponential increase of a conventional BEB method and may be obtained using Equation 5.

$$q = \frac{1}{K} \int_0^K 2^x dx = \frac{(2^K - 1)}{K \ln 2} \quad \text{(Equation 5)}$$

Further, unlike Equation 5, q may be obtained using Equation 6 using an arithmetic mean of 0 to the K power of 2.

$$q = \frac{2^0 + 2^1 + \cdots + 2^K}{K + 1} \quad \text{(Equation 6)}$$

In a situation in which q and K are given, when a predetermined reference value L is determined by Equation 7, p may be simply obtained by Equation 7.

$$q \ K^p + 1 = L \quad \text{(Equation 7)}$$

where L is a value between (q+1) and $2^K$. In Equation 7, p may be obtained by Equation 8.

$$p = \frac{\ln[(L-1)/q]}{\ln(K)} \quad \text{(Equation 8)}$$

In Equation 4, values of W, p, and q are a previously defined value or are calculated by a node (e.g., a base station) that manages a network to be periodically broadcasted.

Further, values of W, p, and q are defined to different values according to a characteristic or a category of data to be transmitted, and values of W, p, and q may be selected and a contention window size may be determined according to a characteristic or a category of data in which respective wireless devices are to transmit. In this case, a category of data may include Background, Best effort, and Video and Voice categories. Specifically, values W, p, and q are determined on a category basis of each data, and the wireless device may select values W, p, and q corresponding to a category of data to be transmitted.

An initial value W of a contention window size presently using in CSMA/CA of a wireless LAN is 16, and according to an exemplary embodiment of the present invention, the wireless device may select and use W as one of values 10, 11, and 12 smaller than 16 while using Equation 4.

The wireless device increases a backoff stage i one by one by at least one condition of a change (e.g., increase) of the number of wireless devices of a network, a collision situation between transmission signals, or a situation of no response signal to a transmission signal and thus a contention window size may increase based on Equation 4. For example, when a collision occurs, the wireless device increases a backoff stage one by one and increases a contention window size based on Equation 4.

Further, by initializing a backoff stage to an initial value or by reducing a backoff stage one by one according to at least one condition of successful transmission of data or a change (e.g., reduction) of the number of wireless devices of a network, the wireless device may initialize a contention window size to an initial value or may reduce a contention window size.

Figure 2:
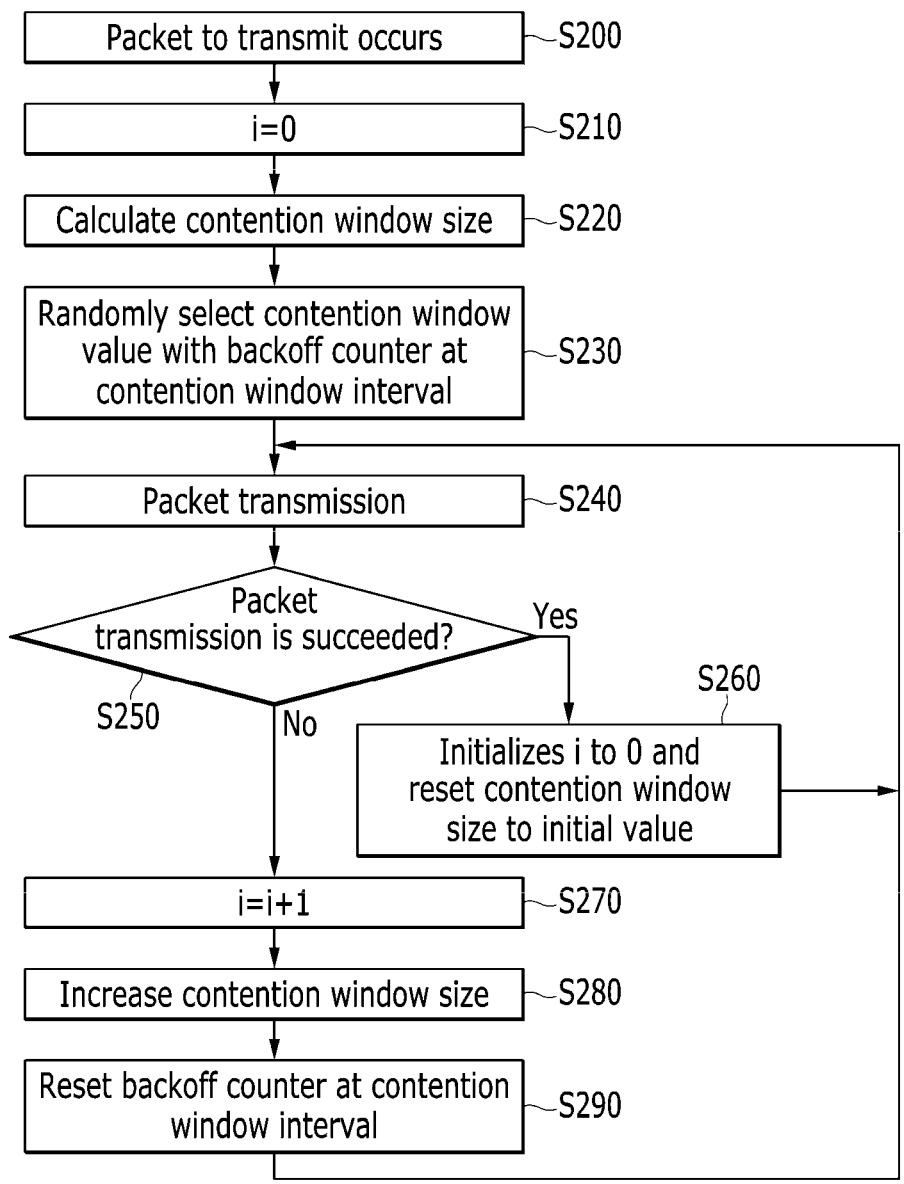
FIG. 2 is a flowchart illustrating a method of determining a contention window size of a wireless device according to an exemplary embodiment of the present invention.

FIG. 2 is a flowchart illustrating a method of determining a contention window size of a wireless device according to an exemplary embodiment of the present invention.

Referring to FIG. 2, when a packet to transmit occurs (S200), the wireless device sets the backoff stage i to 0 (S210) and calculates a contention window size through Equation 4 (S220).

The wireless device randomly selects a contention window value with a backoff counter at a contention window interval corresponding to the contention window size (S230), stands by for a time corresponding to the selected backoff counter, and attempts packet transmission (S240).

At the backoff stage 0, the wireless device determines whether packet transmission is succeeded (S250), and if packet transmission is succeeded, the wireless device maintains the backoff stage to 0, i.e., initializes i to 0 and resets the contention window size to an initial value through Equation 4 (S260).

If packet transmission is failed, the wireless device increases a backoff stage i of a next packet to transmit to i+1

(S270), increases the contention window size through Equation 4 (S280), and resets a backoff counter at a contention window interval corresponding to the increased contention window size (S290).

When operating in this way, if packet transmission that is attempted at the backoff stage i=j is succeeded, i is initialized to 0, and the contention window size is set to an initial value through Equation 4.

Even if the backoff stage i arrives at a maximum value K, when packet transmission is failed, the backoff stage i no longer increases, and the contention window is set to a contention window maximum value. When transmission to the maximum allowable retransmission number of the same packet is failed, a corresponding packet is discarded.

Figure 3:
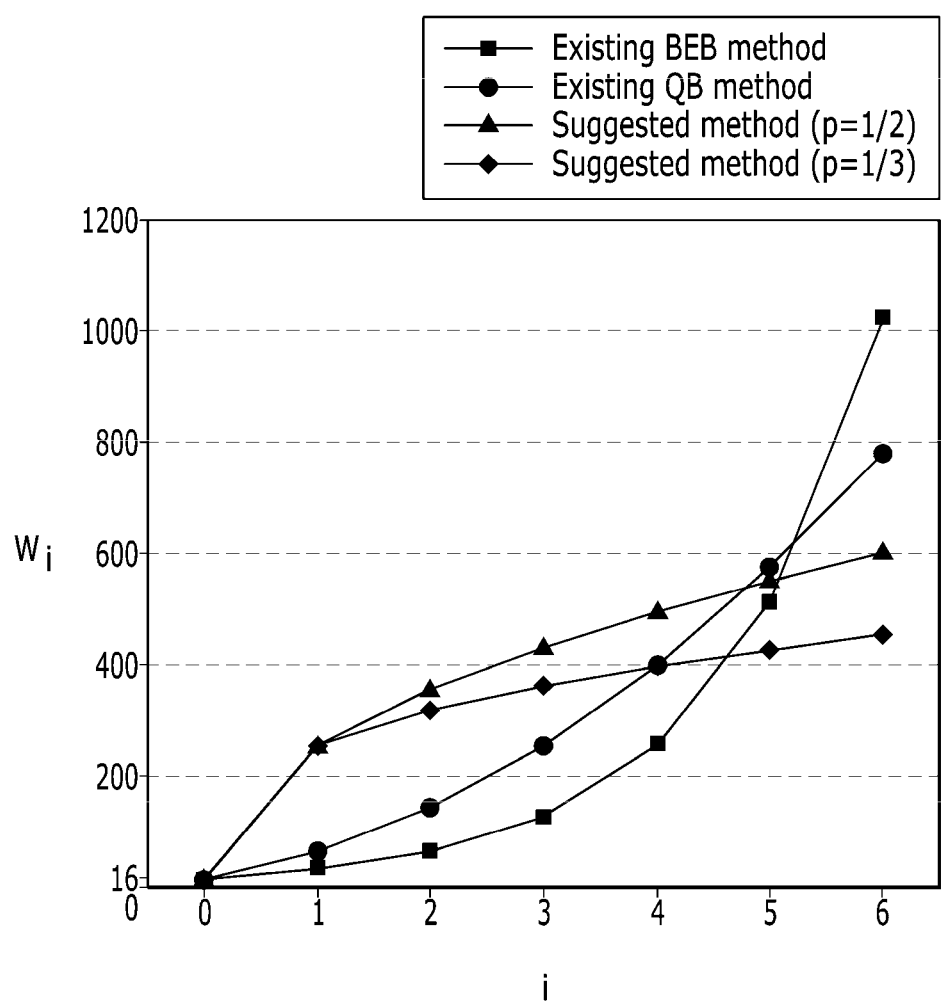
FIG. 3 is a graph illustrating a contention window size by an existing BEB method, an existing QB method, and a suggested method according to an exemplary embodiment of the present invention.

FIG. 3 is a graph illustrating a contention window size by an existing BEB method, an existing QB method, and a suggested method according to an exemplary embodiment of the present invention. As a suggested method according to an exemplary embodiment of the present invention, two suggested methods in which p is set to 1/2 or 1/3 in a state in which q is fixed to 15 in Equation 4 are illustrated.

As shown in FIG. 3, in an existing BEB method or an existing QB method, a contention window size increases in a concave up increasing form, however in a suggested method according to an exemplary embodiment of the present invention, a contention window size increases in a concave down increasing form.

In order to show excellence of a throughput and short-term fairness when using a suggested method according to an exemplary embodiment of the present invention, when q is 15 and p is 1/2, a suggested invention, a BEB method, and a QB method are compared.

When q is 15 and p is 1/2, Equation 4 may be represented with Equation 9.

$$W_i = W \cdot [15 \cdot (i)^{1/2} + 1] = W \cdot [15 \cdot \text{sqrt}(i) + 1] \quad \text{(Equation 9)}$$

where W is an initial value of a contention window size and is set to 16, and sqrt represents the square root, and i sequentially has 0, 1, 2, 3, 4, 5, and 6.

Figure 4:
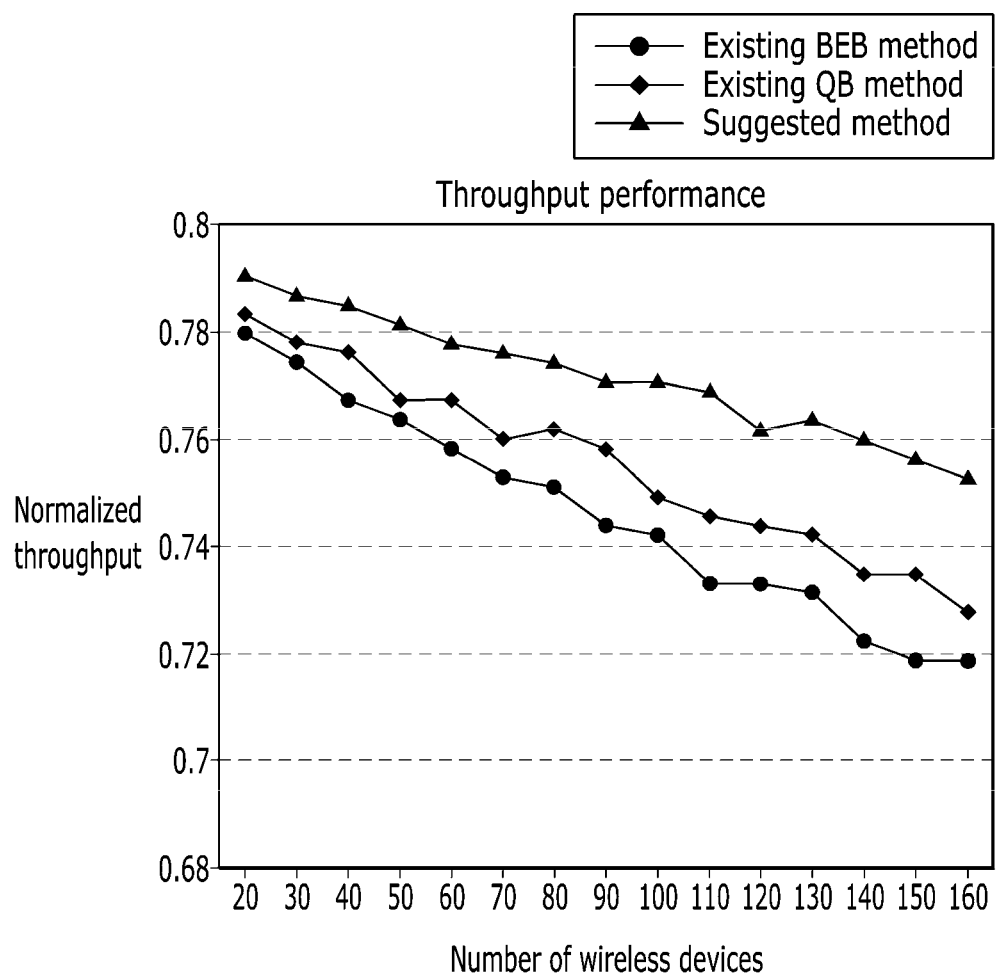
FIGS. 4 and 5 each are graphs comparing a throughput and short-term fairness by a BEB method, a QB method, and a suggested method of Equation 9 in a simulation condition of Table 1.
Figure 5:
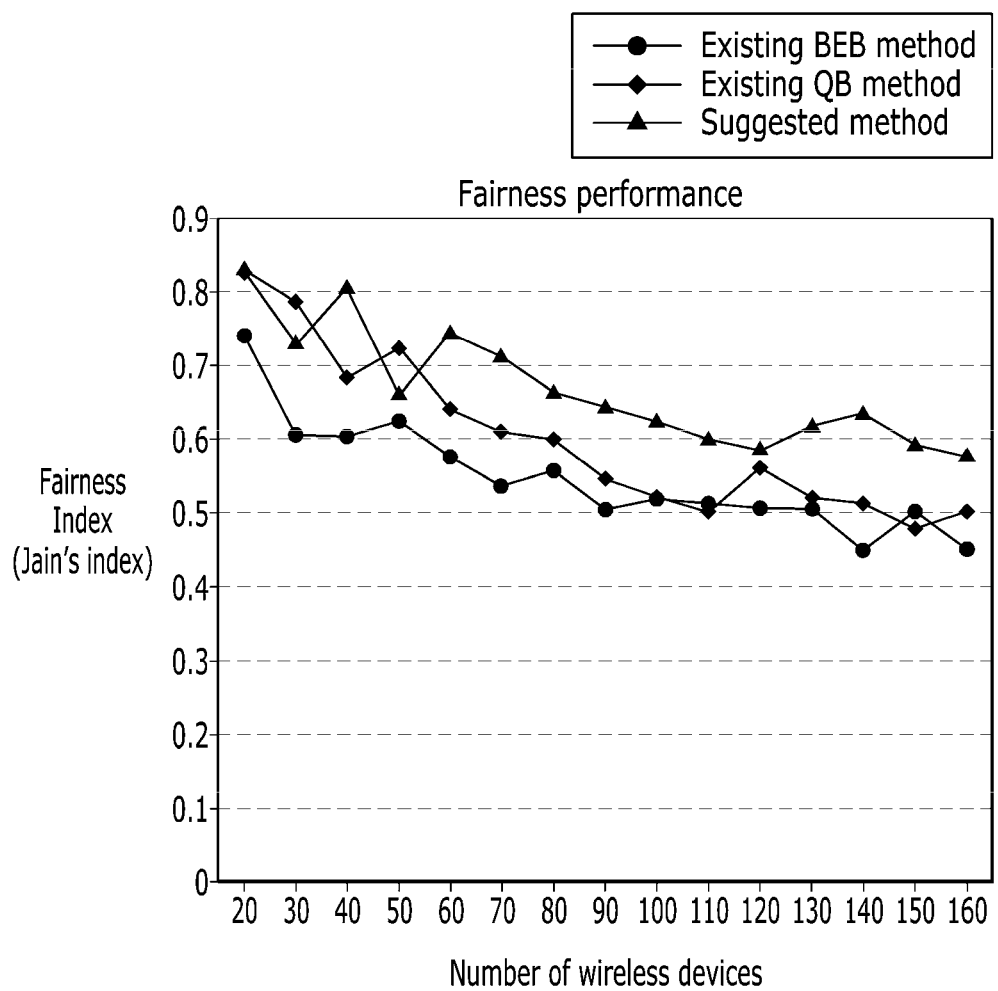

FIGS. 4 and 5 each are graphs comparing a throughput and short-term fairness by a BEB method, a QB method, and a suggested method of Equation 9 in a simulation condition of Table 1.

As shown in FIGS. 4 and 5, it can be seen that a suggested method of Equation 9 according to an exemplary embodiment of the present invention is more excellent than a BEB method or a QB method in a throughput and short-term fairness.

TABLE 1

| Predetermined item | Value |
| --- | --- |
| Wireless transmission method | 802.11a |
| Physical layer transmission speed | 6.5 Mbps |
| Packet size | 1460 byte |
| Simulation time | 1 second |
| Traffic model | Saturation traffic model |
| RTS/CTS | Use |

Table 2 illustrates a comparison result of a contention window size and a contention window interval on an i-value basis according to an existing BEB method and QB method and a suggested method.

TABLE 2

| Classification | | 0 | 1 | 2 | 3 | 4 | 5 | 6 |
| --- | --- | --- | --- | --- | --- | --- | --- | --- |
| Existing BEB | Window size | 16 | 32 | 64 | 128 | 256 | 512 | 1024 |
| | Window interval | [0, 15] | [0, 31] | [0, 63] | [0, 127] | [0, 255] | [0, 511] | [0, 1023] |
| Existing QB | Window size | 16 | 64 | 144 | 256 | 401 | 577 | 785 |
| | Window interval | [0, 15] | [0, 63] | [0, 143] | [0, 255] | [0, 400] | [0, 576] | [0, 784] |
| Suggested invention | Window size | 16 | 256 | 355 | 432 | 496 | 553 | 604 |
| | Window interval | [0, 15] | [0, 255] | [0, 354] | [0, 431] | [0, 495] | [0, 552] | [0, 603] |

Further, Equation 4 in which q is 18 and in which p is 0.3536 may be represented with Equation 10.

$$W_i = W \cdot [18 \cdot (i)^{0.3035} + 1] \quad \text{(Equation 10)}$$

where W is an initial value of a contention window size and is set to 11, and i sequentially has 0, 1, 2, 3, 4, 5, and 6.

Table 3 illustrates a comparison result of a contention window size and a contention window interval that are determined by Equation 10 according to an exemplary embodiment of the present invention with an existing BEB method and QB method on an i-value basis in a simulation condition of Table 1.

TABLE 3

| Classification | | 0 | 1 | 2 | 3 | 4 | 5 | 6 |
|---|---|---|---|---|---|---|---|---|
| | | | | | i | | | |
| Existing BEB | Window size | 16 | 32 | 64 | 128 | 256 | 512 | 1024 |
| | Window interval | [0, 15] | [0, 31] | [0, 63] | [0, 127] | [0, 255] | [0, 511] | [0, 1023] |
| Existing QB | Window size | 16 | 64 | 144 | 256 | 401 | 577 | 785 |
| | Window interval | [0, 15] | [0, 63] | [0, 143] | [0, 255] | [0, 400] | [0, 576] | [0, 784] |
| Suggested invention | Window size | 11 | 209 | 255 | 287 | 313 | 334 | 352 |
| | Window interval | [0, 10] | [0, 208] | [0, 254] | [0, 286] | [0, 312] | [0, 333] | [0, 351] |

As shown in Tables 2 and 3, it may be determined that a contention window size that is determined according to an exemplary embodiment of the present invention has a concave down increasing form, unlike an existing BEB method or an existing QB method.

Figure 6:
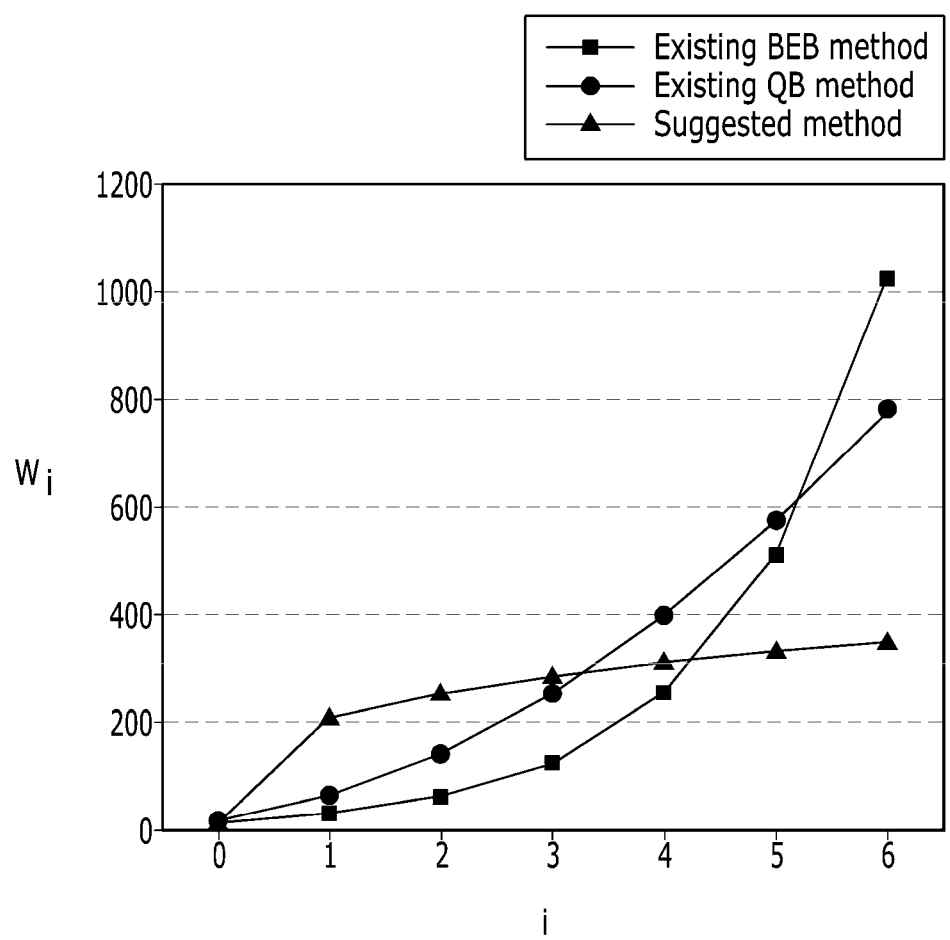
FIG. 6 is a graph illustrating a difference of a contention window size by an existing BEB method and QB method and Equation 10 according to an exemplary embodiment of the present invention.
Figure 7:
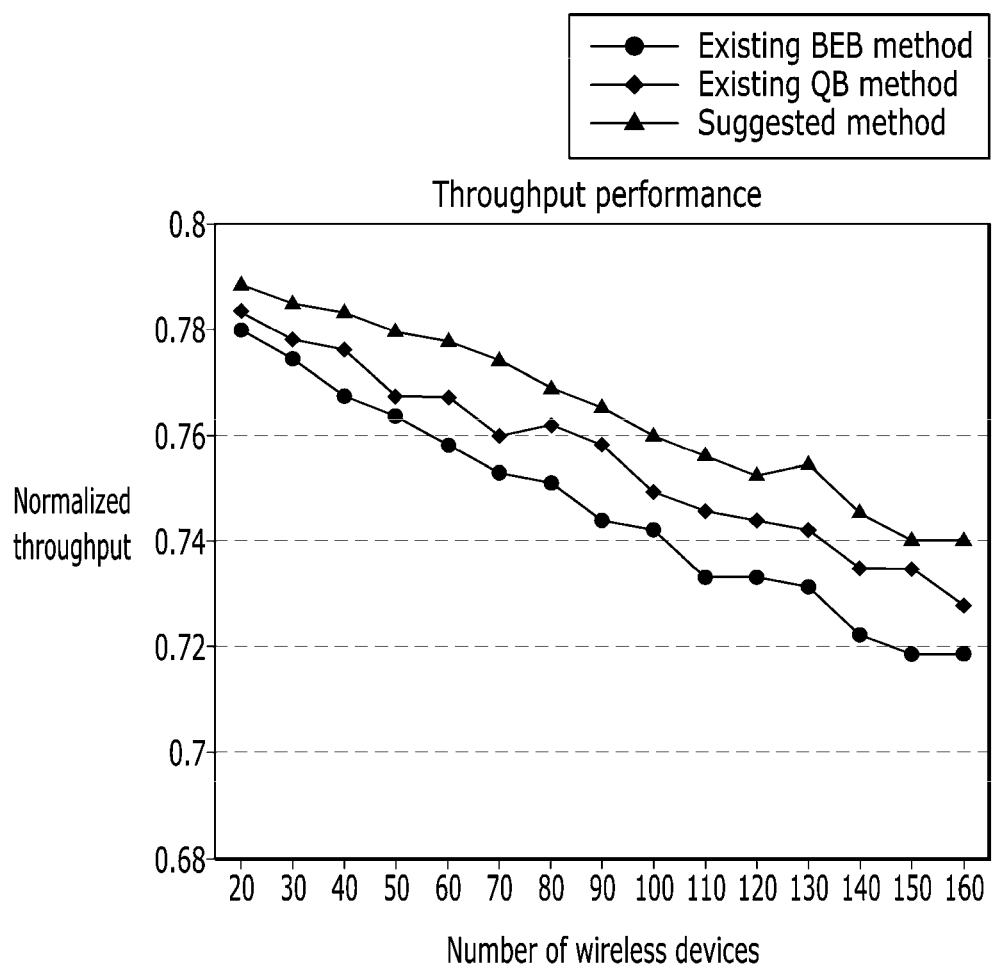
FIGS. 7 and 8 each are graphs comparing a throughput and short-term fairness by a BEB method, a QB method, and a suggested method of Equation 10.
Figure 8:
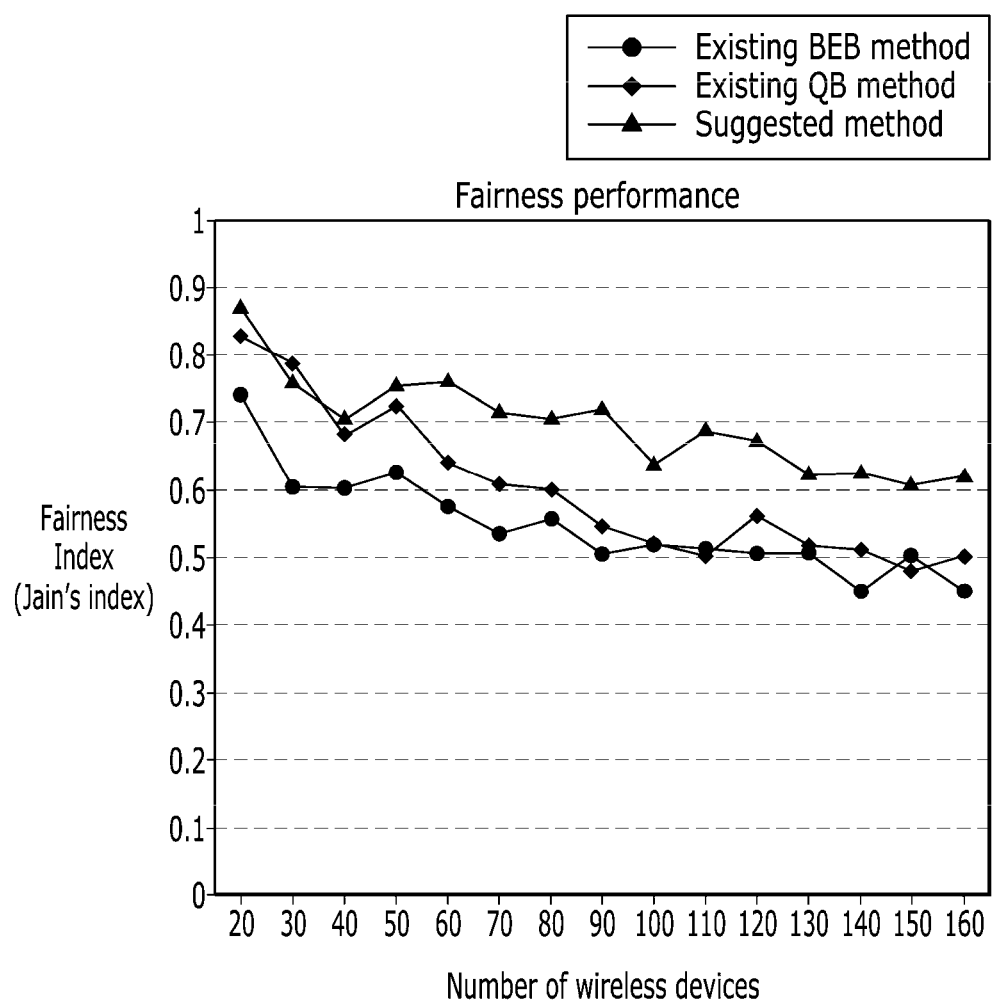

FIG. 6 is a graph illustrating a difference of a contention window size by an existing BEB method and QB method and Equation 10 according to an exemplary embodiment of the present invention, and FIGS. 7 and 8 each are graphs comparing a throughput and short-term fairness by a BEB method, a QB method, and a suggested method of Equation 10.

As shown in FIG. 6, it can be seen that a difference in a contention window size according to an i-value is small in a suggested invention, compared with an existing BEB method and QB method.

Further, as shown in FIGS. 7 and 8, it can be seen that a suggested method of Equation 10 according to an exemplary embodiment of the present invention is more excellent than a BEB method or a QB method in a throughput and short-term fairness.

Figure 9:
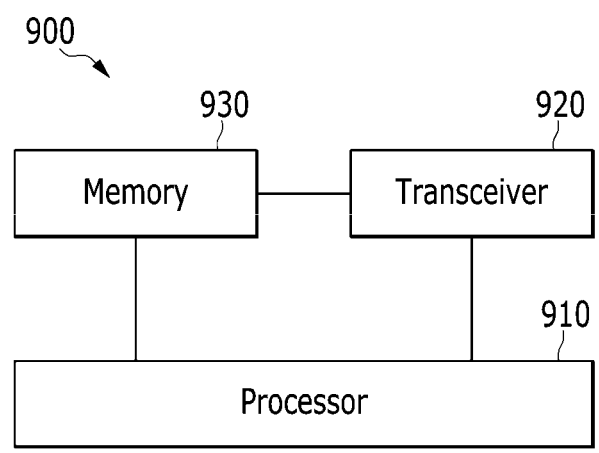
FIG. 9 is a block diagram illustrating a configuration of a contention window size determination apparatus according to an exemplary embodiment of the present invention.

FIG. 9 is a block diagram illustrating a configuration of a contention window size determination apparatus according to an exemplary embodiment of the present invention.

Referring to FIG. 9, a contention window size determination apparatus 900 includes a processor 910, a transceiver 920, and a memory 930.

The processor 910 determines a contention window size based on Equation 4. Values of W, p, and q may be previously calculated and stored through Equations 5 to 8, and the processor 910 may select values of W, p, and q corresponding to a category of data to transmit among previously stored values of W, p, and q on a category basis of each data. The processor 910 may select an initial value of a contention window size in Equation 4 to one of values 10, 11, 12. The processor 910 determines a value of a backoff stage i by at least one condition of a change of the number of wireless devices of a network, a collision situation between transmission signals, or a situation of no response signal to a transmission signal. A backoff stage i of a packet to presently transmit is determined according to a backoff stage value of a previous packet and a transmission result (success or collision). When transmission of a previous packet is succeeded at a backoff stage i, the processor 910 reduces a backoff stage of a packet to presently transmit to 0 and resets a backoff counter. However, when packet transmission that has been attempted at an previous backoff stage i is failed (or collides), the processor 910 increases a backoff stage of a packet to transmit to i+1 and resets the backoff counter.

The transceiver 920 is connected to the processor 910 to transmit and receive a wireless signal.

The memory 930 stores instructions for performing in the processor 910 or loads and temporarily stores instructions from a storage device (not shown), and the processor 910 executes instructions that are stored or loaded at the memory 930. Further, the memory 930 stores values of W, p, and q and may store values of W, p, and q on a category basis of each data.

The processor 910 and the memory 930 are connected through a bus (not shown), and an input/output interface (not shown) may be connected to the bus. In this case, the transceiver 920 is connected to the input/output interface, and a peripheral device such as an input device, a display, a speaker, and a storage device may be connected to the input/output interface.

According to an exemplary embodiment of the present invention, in a throughput and short-term fairness performance of a wireless LAN, an excellent performance can be provided, compared with a BEB method or a QB method.

An exemplary embodiment of the present invention may not only be embodied through the above-described apparatus and/or method but may also be embodied through a program that executes a function corresponding to a configuration of the exemplary embodiment of the present invention or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method in which a wireless device of a communication system determines a contention window size, the method comprising:
   randomly selecting a backoff counter at a contention window interval corresponding to a contention window size that is determined according to a backoff stage;
   attempting packet transmission, if the backoff counter becomes 0 while reducing the backoff counter, when a radio channel is in an idle status; and
   increasing the contention window size while increasing the backoff stage by 1 according to a first predetermined condition,
   wherein the contention window size has a concave down increasing form, as the backoff stage increases.

2. The method of claim 1, wherein the contention window size is calculated by Equation 1, the Equation 1 is $W_i = W \cdot [q \cdot (i)^p + 1]$, and the q is a positive real number, the p is a real number between 0 and 1, [x] is a function of returning an integer value nearest to x, the i is the backoff stage, and the W is an initial value of a contention window size.

3. The method of claim 2, further comprising receiving values of the q, the p, and the W from a node that manages a network.

4. The method of claim 2, further comprising selecting values of W, p, and q corresponding to a category of a packet to transmit among values of W, p, and q that are determined according to a data category.

5. The method of claim 2, further comprising selecting one of 10, 11, and 12 as an initial value of the contention window size.

6. The method of claim 2, wherein the first predetermined condition comprises at least one of increase of the number of wireless devices in a network, a collision between transmission, and no response to transmission.

7. The method of claim 2, further comprising initiating the backoff stage to the initial value and initializing the contention window size according to a second predetermined condition.

8. The method of claim 7, wherein the second predetermined condition comprises at least one of success of the packet transmission and reduction of the number of wireless devices in a network.

9. The method of claim 2, wherein the q is obtained from an entire average from 0 to the K power of 2, when a maximum value of the backoff stage is K.

10. The method of claim 9, wherein the p is obtained by Equation 2, the Equation 2 is $q K^p + 1 = L$, and the L is a predetermined reference value.

11. The method of claim 2, wherein the q is obtained from an arithmetic mean from 0 to the K power of 2, when a maximum value of the backoff stage is K.

12. The method of claim 11, wherein the p is obtained by Equation 2, the Equation 2 is $q K^p + 1 = L$, and the L is a predetermined reference value.

13. An apparatus that determines a contention window size in a wireless device of a communication system, the apparatus comprising:

a processor that randomly selects a backoff counter at a contention window interval corresponding to a contention window size and that attempts packet transmission, if the backoff counter becomes 0 by gradually reducing, when a radio channel is in an idle status and that increases the contention window size while increasing the backoff stage by 1 according to a first predetermined condition; and a transceiver that is connected to the processor and that transmits/receives a wireless signal, wherein the contention window size has a concave down increasing form, as the backoff stage increases.

14. The apparatus of claim 13, wherein the processor calculates the contention window size based on Equation 1, the Equation 1 is $W_i = W \cdot [q \cdot (i)^p + 1]$, and the q is a positive real number, the p is a real number between 0 and 1, [x] is a function of returning an integer value nearest to x, the i is the backoff stage, and the W is an initial value of a contention window size.

15. The apparatus of claim 14, wherein the processor selects values of W, p, and q corresponding to a category of a packet to transmit among values of W, p, and q that are determined according to a category of data and applies the selected values to Equation 1.

16. The apparatus of claim 14, wherein the processor uses one of 10, 11, and 12 as an initial value of a contention window size.

17. The apparatus of claim 14, wherein the q is obtained from an entire average or an arithmetic mean from 0 to the K power of 2, when a maximum value of the backoff stage is K.

18. The apparatus of claim 17, wherein the p is obtained by Equation 2, the Equation 2 is $q K^p + 1 = L$, and the L is a predetermined reference value.

19. The apparatus of claim 13, wherein the first predetermined condition comprises at least one of increase of the number of wireless devices in a network, a collision between transmission, and no response to transmission.

20. The apparatus of claim 13, wherein the processor initializes the backoff stage to the initial value and initializes the contention window size according to a second predetermined condition, and the second predetermined condition comprises at least one of success of the packet transmission and reduction of the number of wireless devices in a network.

\* \* \* \* \*